United States Patent [19]
Schnizlein

[11] Patent Number: 5,898,685
[45] Date of Patent: *Apr. 27, 1999

[54] BURST SYNCHRONIZATION OF TIME DIVISION MULTIPLEXED TRANSCEIVER PAIRS

[75] Inventor: Paul Schnizlein, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,015

[22] Filed: Aug. 1, 1997

Related U.S. Application Data

[63] Continuation of application No. 08/579,075, Dec. 22, 1995, abandoned, which is a continuation of application No. 08/191,940, Feb. 4, 1994, abandoned.

[51] Int. Cl.$^6$ ............................... H04J 3/10; H04J 3/06; H04B 7/26
[52] U.S. Cl. ......................... 370/350; 370/516; 455/426; 455/502; 455/63
[58] Field of Search ................................... 370/314, 336, 370/337, 347, 350, 317, 503, 516, 517, 519; 455/426, 501, 502, 524, 63; 375/346, 354, 356, 362, 371

[56] References Cited

U.S. PATENT DOCUMENTS

| | | | |
|---|---|---|---|
| 4,706,244 | 11/1987 | Watson et al. | 370/482 |
| 5,201,061 | 4/1993 | Goldberg et al. | 455/57.1 |
| 5,239,672 | 8/1993 | Kurby et al. | 455/51.2 |
| 5,257,404 | 10/1993 | Goreham et al. | 455/51.2 |
| 5,285,443 | 2/1994 | Patsiokas et al. | 370/29 |
| 5,347,562 | 9/1994 | Candy | 379/58 |

OTHER PUBLICATIONS

European Telecommunications Standards Institute (ETSI), "Radio Equipment and Systems (RES); Common air interface specification to be used for the interworking between cordless telephone apparatus in the frequency band 864,1 MHz to 868,1 MHz, including public access services", Interim European Telecommunication Standard, Second Edition, Jan. 31, 1994, pp. 241–244 France.

*Primary Examiner*—Hassan Kizou

[57] ABSTRACT

A time division multiplexed communications system is disclosed. The system includes multiple transceiver pairs. Each of the transceiver pairs operates according to its own timer. The transceiver pairs each include circuitry that synchronizes the respective timers to a common frequency signal supplied to each of the transceiver pairs. By so synchronizing the timer of each transceiver pair to a common frequency signal, transmissions of all the transceiver pairs in the system are synchronized. Synchronization of transmissions can reduce noise and interference between neighboring transceiver pairs.

14 Claims, 6 Drawing Sheets

BURST SYNCHRONIZATION OF TIME DIVISION MULTIPLEXED TRANSCEIVER PAIRS

CROSS-REFERENCE TO RELATED APPLICATIONS

This is a continuation of application Ser. No. 08/579,075, filed Dec. 22, 1995, now abandoned, which is a continuation of application Ser. No. 08/191,940, filed Feb. 4, 1994, now abandoned.

This application is related to the following U.S. Patent Applications:

| Serial Number | Filing date | Status |
| --- | --- | --- |
| 07/917,497 | 7/21/92 | PAT. NO. 5,488,743 |
| 07/917,489 | 7/21/92 | PAT. NO. 5,408,639 |
| 07/917,488 | 7/21/92 | Abandoned |
| 07/917,503 | 7/21/92 | Abandoned |
| 07/918,627 | 7/21/92 | PAT. NO. 5,555,287 |
| 07/918,626 | 7/21/92 | |
| 07/918,625 | 7/21/92 | Abandoned |
| 07/918,624 | 7/21/92 | PAT. NO. 5,404,459 |
| 07/918,631 | 7/21/92 | Abandoned |
| 07/918,632 | 7/21/92 | Abandoned |
| 07/918,622 | 7/21/92 | Abandoned |
| 08/192,007 | 2/4/94 | Abandoned |
| 08/191,949 | 2/4/94 | Abandoned |
| 08/191,994 | 2/4/94 | Abandoned |
| 08/192,046 | 2/4/94 | PAT. NO. 5,638,405 |
| 08/192,057 | 2/4/94 | Abandoned |
| 08/238,524 | 5/5/94 | Abandoned |
| 08/191,948 | 2/4/94 | PAT. NO. 5,596,724 |
| 08/191,818 | 2/4/94 | PAT. NO. 5,697,062 |
| 07/918,621 | 7/21/92 | PAT. NO. 5,420,904 |

All of the related applications are assigned to the assignee of the present invention and are hereby incorporated herein in their entirety by this reference thereto.

BACKGROUND OF THE INVENTION

1. Field of the Invention

The invention relates to systems and methods for synchronizing timing of transceiver pairs and, more particularly, relates to systems and methods for controlling the synchronization of time division multiplexes of transceiver pairs by adjusting the receiver timers to synchronize the transmitter timers.

2. Description of the Related Art

Time division multiplexed (TDM) communications systems comprise multiple transmitters and receivers that share a common communication channel. Sharing of the common channel among the several users in such systems is possible because each user is allowed to use the channel only for a given period of time in a defined, repeated sequence. In this manner, time division permits the transmission of two or more signals over a common channel path by using different time intervals for the transmission of the intelligence of each message signal.

Cordless telephony is increasing in popularity, both in the United States and other countries. The conventional corded telephone consists of a base unit and a handset unit connected by an electrical cord. Because of the connection of base unit and handset unit in the conventional corded telephone, the user's range of motion is limited to the extent of the electrical cord. Cordless telephones, on the other hand, allow the user greater range of motion while using the telephone. Instead of a physical electrical cord connecting handset and base unit, cordless telephone handset and base units communicate with each other over a communication channel established by the transmission and reception of electromagnetic waves, conventionally radio waves.

Several cordless telephone system standards were previously developed and have been implemented. Most of the cordless telephone systems today conform to one of those standards. One standard, Cordless Telephony Generation 2 (CT2) interface specification for digital technology, is currently widely followed in the United Kingdom and certain European countries. The CT2 standard has been accepted by the European Telecommunications Standard Institute (ETSI) as an interim European standard. In the U.S., a different standard, the Digital European Cordless Telecommunications (DECT) standard, has been most commonly followed. It appears the CT2 standard will shortly become the European country permanent standard and that such standard will be adopted in other countries, including those of Asia and the Pacific Rim.

In any TDM communications system (whether based on the CT2 standard, the DECT standard, or other), it is a design objective to provide the best possible transceiver pair transmission and reception. In those systems, however, the several transceiver pairs that comprise the system are often located in relatively close proximity. In particular in the case of cordless telephones of those systems, relatively close proximity of the several cordless base stations can result in significant noise and interference between base stations.

This noise and interference between base stations can occur, in particular, when the several transmitters transmit at different times and/or the several receivers receive at different times. The noise and interference occurs because the transmitters generate radio frequency (RF) energy at a high level relative to the low level at which the receivers detect RF energy. If the transmitters of the system are not synchronized, a base station receiver must reject the high level transmission of neighboring transmitters in order to suitably receive the low level intended to be received by the base station receiver. It has been discovered in connection with the present invention that synchronizing transmissions and receptions among the individual telephone units in cordless telephone systems can eliminate much of the noise and interference. If the transmitters of the system are synchronized per the present invention, all transmitters transmit at the same time and all receivers receive at the same time. Therefore, interference and noise from neighboring transmitters may be eliminated because reception and transmission will always occur at different times within the system.

In the prior technology, it has been possible to program the transmit counter of each individual telephone unit of the system to be ahead in time of the particular unit's receiver counter by some arbitrary amount which is referred to as the modem delay for the system. Modem delay is comprised of two components, transmit modem delay and receive modem delay. The sum of these components is the modem delay for the particular telephone unit of the system. In the prior technology, the user had to measure the modem delay of each individual telephone unit of the system and then program each particular unit to account for the particular modem delay of the unit. As is apparent, this accounts with respect to each individual telephone unit for the modem delay experienced by that unit; however, it does not necessarily synchronize all transmissions and receptions of every telephone unit in the system.

The present invention utilizes the receiver modem delay of each individual telephone unit within a cordless telephone system to provide synchronization of transmit signals throughout the system. In this manner, the present invention eliminates base unit transmit signal interference, even among neighboring telephone units of the system. The present invention is thought to be particularly effective when implemented in systems and methods of cordless telephony. In particular, the present invention is particularly desirable in the case of cordless telephone systems comprising multiple base units and handset units and which conform to the CT2 standard. Though particularly desirable in those applications, it is believed the invention can further solve many other diverse problems found in telephone and digital communications and device systems generally, regardless of particular standards, if any, which may apply. As will be apparent, the present invention has numerous and varied application and is a significant improvement in the art.

SUMMARY OF THE INVENTION

In one embodiment, the present invention is a method of reducing noise between neighboring transceiver pairs. The method comprises the step of synchronizing transmissions by the transceiver pairs.

In another embodiment, the invention is a time division multiplexed communications system. The system comprises multiple transceiver pairs, each of the transceiver pairs operating according to a different timer, and a synchronizer for causing each of the different timers to have an identical period and an identical phase.

In another aspect, the circuitry of each of the transceiver pairs serves to synchronize the timers to a desired common frequency signal supplied to each of the transceiver pairs in order that transmissions of the transceiver pairs are synchronized.

BRIEF DESCRIPTION OF THE DRAWINGS

For a more complete understanding of the present invention and for further objects and advantages thereof, reference may now be had to the following description in conjunction with the accompanying drawings, in which.

DETAILED DESCRIPTION OF THE INVENTION

The following detailed description primarily addresses a preferred embodiment of the present invention. Those skilled in the art will readily recognize, however, that there are many possible embodiments of the invention, and these may be employed in a wide variety of instances and under varied conditions. The following detailed description also primarily addresses the preferred embodiment in an application to TDM communications systems conforming to the CT2 standard. Those skilled in the art will, nevertheless, appreciate and recognize that alternative applications, aspects and embodiments of the invention are possible. All those other applications, aspects and embodiments are hereby expressly included in, and form a part of, the invention.

Generally, the invention in one embodiment includes systems and methods for synchronizing burst signals in a TDM system. The embodiment of the invention is particularly suitable in communication systems applications and, even more particularly, in communication system applications in which the system comprises multiple transceiver pairs. Even further, the embodiment of the invention is particularly effective when the communication system conforms to and operates in accordance with the CT2 standard. Nevertheless, the embodiment, and the invention as a whole, should not be considered as limited to those applications and that standard, as the invention has and will have greater and more varied utility.

Figure 1:
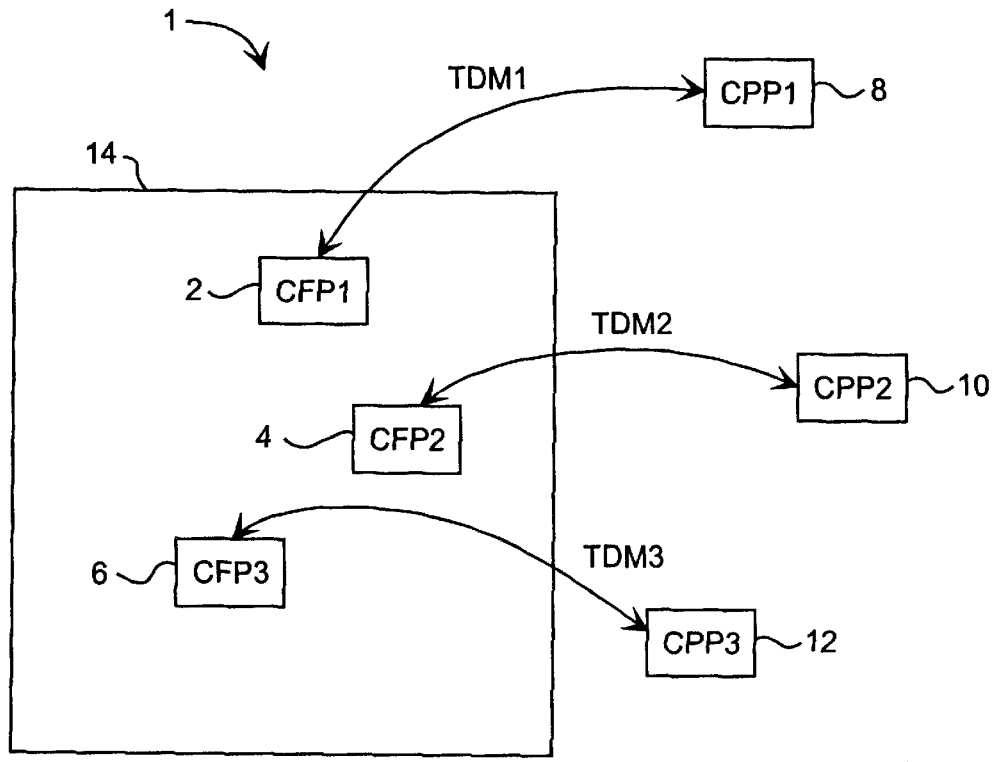
FIG. 1 is a simplified illustration of a TDM communications system comprised of three transceiver pairs.

Referring first to FIG. 1, an exemplary communications system 1 is illustrated in block form. This exemplary communications system 1 is a TDM communications system. The exemplary system 1 is comprised of three transceiver pairs, i.e., CFP1/CPP1, CFP2/CPP2, and CFP3/CPP3. Each transceiver pair includes a cordless fixed part 2,4,6 and a cordless portable part 8,10,12, respectively. The transceiver pairs each do not have any electrical cord extending between the related cordless fixed parts 2,4,6 and cordless portable parts 8, 10, 12. The cordless fixed parts 2,4,6 and their respective cordless portable parts 8,10,12 instead communicate by radio waves, i.e. TDM1, TDM2, TSM3. Radio wave signals between transceiver pairs operate in a time division multiplexed manner in which transmit signals and receive signals share a common communication channel by using different time intervals for the transmission of the intelligence of each signal. This exemplary communications system, then, is like that of the typical cordless telephony systems now employed. In the typical cordless telephony systems, the cordless fixed parts 2,4,6 are base units and the cordless portable parts 8,10,12 are handset units.

Still referring to FIG. 1, interference area 14 for the cordless fixed parts 2,4,6 is illustrated as a box enclosing the cordless fixed parts 2,4,6. Within the interference area 14, transmission signals of each of the cordless fixed parts 2,4,6 can reach the other cordless fixed parts 2,4,6. As previously described, such close relative proximity of cordless fixed parts 2,4,6 within an interference area 14 can result in significant noise and interference between the cordless fixed parts 2,4,6. In particular, this noise and interference can occur when the transmitters of the cordless fixed parts 2,4,6 transmit at different times. This is because the transmitters of the cordless fixed parts 2,4,6 generate RF energy at a high level relative to the low level at which the receivers of the cordless fixed parts 2,4,6 detect RF energy.

Figure 2:
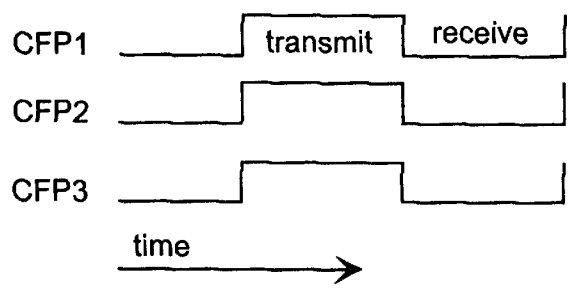
FIG. 2 illustrates transmit and receive signal timing for the three transceiver pairs of the TDM communications system of FIG. 1, when the transmit and receive timers (i.e. counters) of the three transceiver pairs are synchronized.

Referring next to FIG. 2, certain possible transmit and receive signal timing for the three transceiver pairs of the TDM communications system of FIG. 1 is shown. Note that the signals along the time line for each cordless fixed part 2,4,6 is identical. That is, each cordless fixed part 2,4,6 transmits during the same time interval and receives during the same time interval. Under these circumstances, the transmissions and receptions of the cordless fixed parts 2,4,6 are synchronized. As previously described, this synchronization is desirable to eliminate the problems of noise and interference between cordless fixed parts 2,4,6 due to the relatively different transmit and receive RF energy levels for the system 1.

Figure 3:
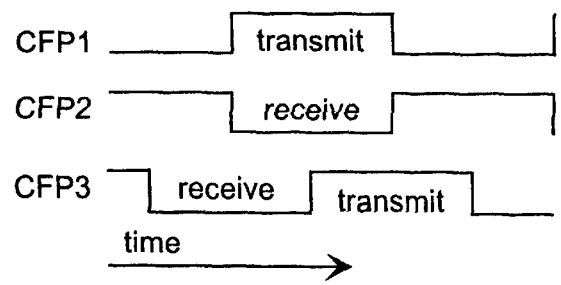
FIG. 3 illustrates transmit and receive signal timing for the three transceiver pairs of the TDM communications system of FIG. 1, when the transmit and receive timers (i.e., counters) of the three transceiver pairs are not synchronized.

Now referring to FIG. 3, certain other possible transmit and receive signal timing for the three transceiver pairs of the TDM communications system of FIG. 1 is shown. Note that in this instance the signals along the time line for each cordless fixed part 2,4,6 differs from the time lines for the other cordless fixed parts 2,4,6. Here, the transmissions and receptions of the cordless fixed parts 2,4,6 are not synchronized. This asynchrony results in noise and interference between the cordless fixed parts 2,4,6 due to the relatively different transmit and receive RF energy levels being simultaneously felt within the interference area 14. This asynchronous arrangement is not desirable because mechanisms for rejecting unintended signals must be incorporated in the cordless fixed parts 2,4,6. Otherwise, the system 1 is hampered by noise and interference. The preferred embodiment of the present invention achieves synchronous timing of transmitters and, therefore, eliminates the problems of asynchronous timing in these systems 1.

Figure 4:
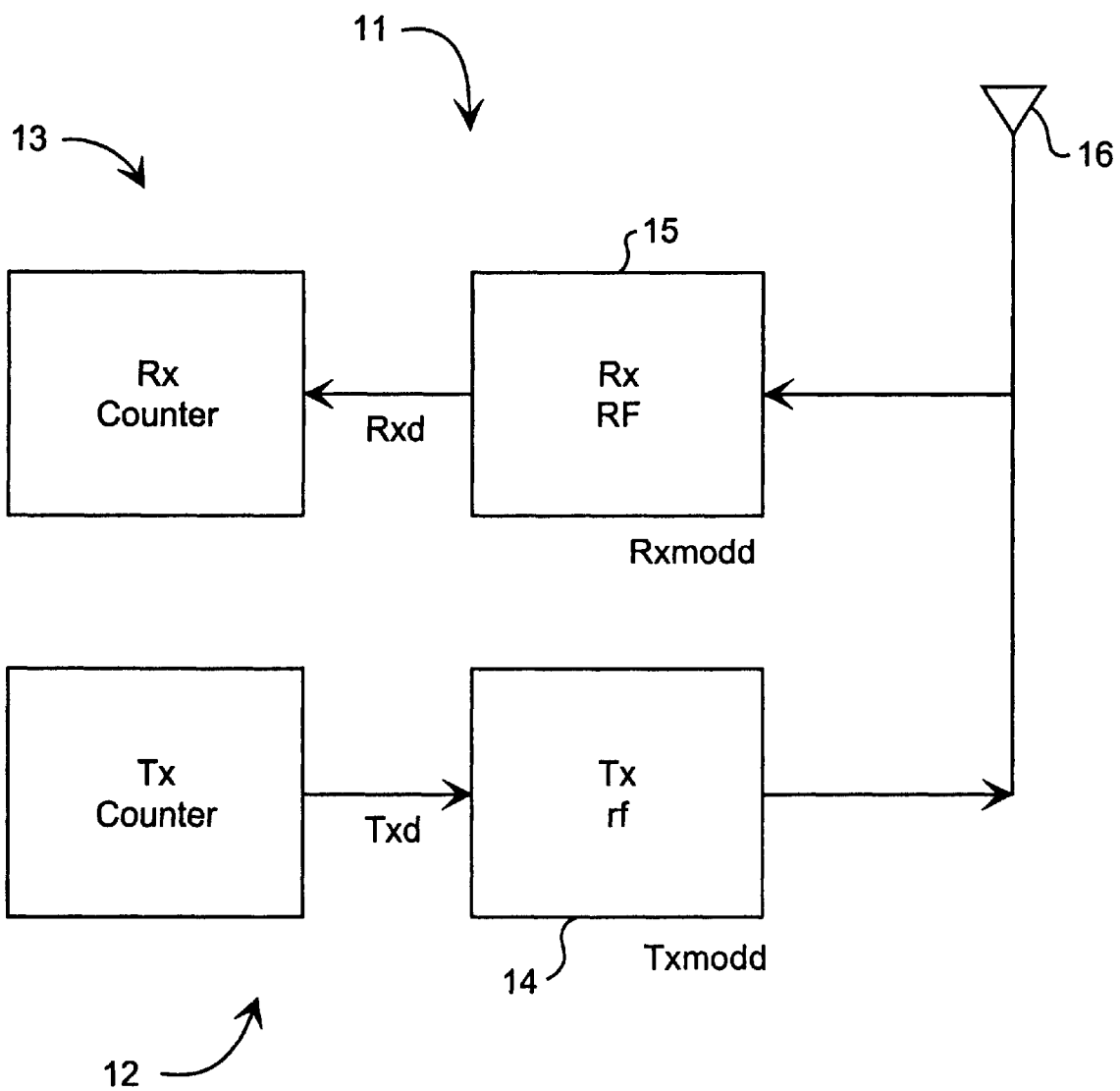
FIG. 4 illustrates transceiver pair signal transmission and reception and the modem delay which occurs.

Next referring to FIG. 4, operation of a single transceiver pair 11 is illustrated. In this operation, one transceiver, a first transceiver 12, of the transceiver pair 11 transmits a signal and the other transceiver, a second transceiver 13, of the transceiver pair 11 receives the signal, for example, a radio frequency wave signal. At the first transceiver 12, the signal is transmitted according to the timing of the first transceiver 12 counter. The signal does not follow the exact timing of the first transceiver 12 counter, however, due to the phenomenon of transmit modem delay, illustrated by box 14. The signal, delayed by the transmit modem delay 14, then proceeds to an antenna 16 and then on to the second transceiver 13. At the second transceiver, the signal is also affected by a delay effect, receive modem delay, illustrated by box 15. Only after the signal is delayed by the receive modem delay 15 does the second transceiver 13 detect the signal according to the timing of the second transceiver counter. For purposes of the discussion herein, the term "modem delay" (or "modidly") shall mean the sum of the transmit modem delay 14 and the receive modem delay 15 for a particular transceiver pair.

Figure 5:
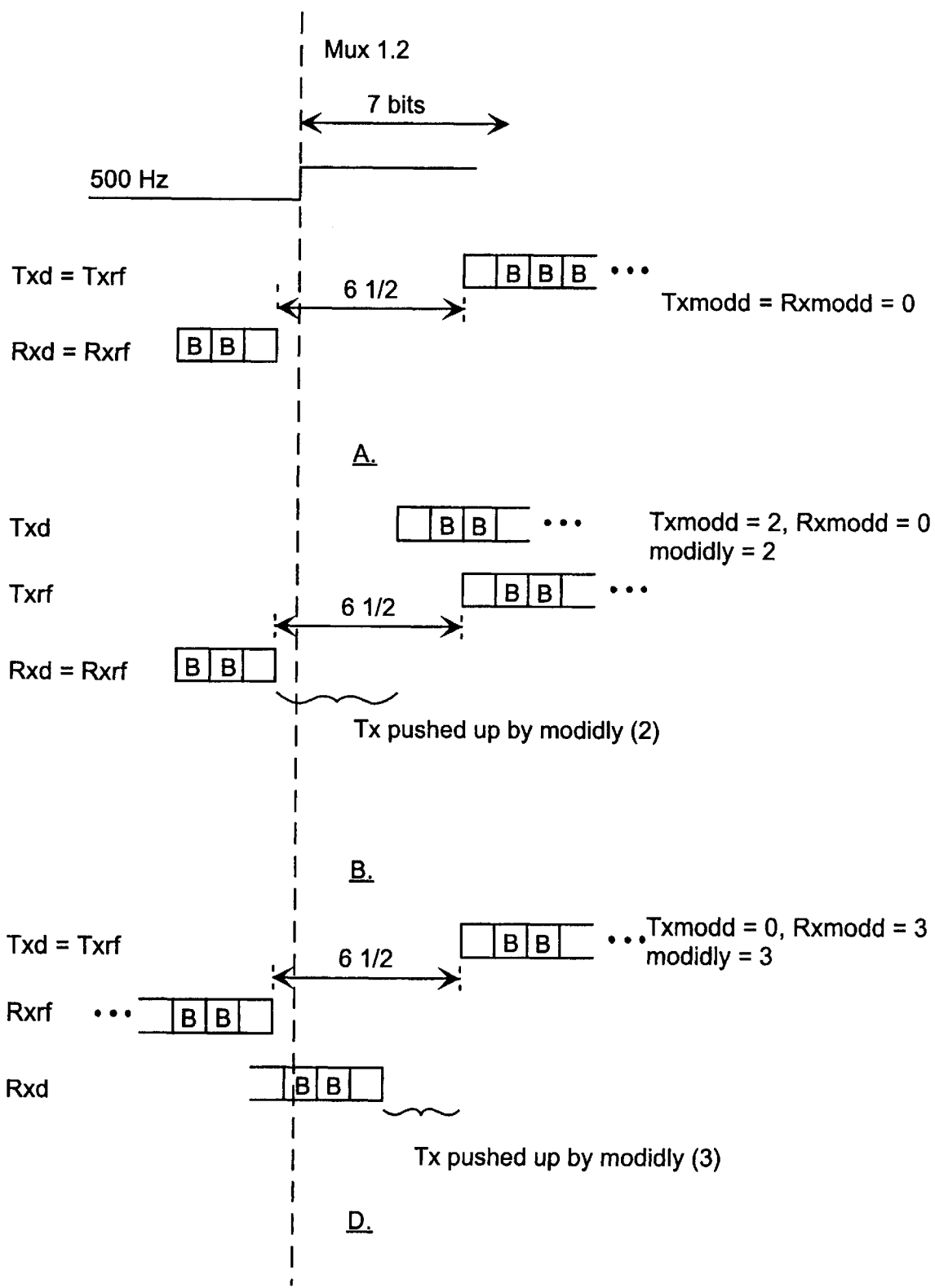
FIG. 5 illustrates, for three exemplary scenarios, receiver adjustment to achieve transmitter synchronization.

Referring now to FIG. 5, the concept of the embodiment of the present invention is illustrated and can be discussed. If the modem delay for a particular transceiver pair is known and either the transmit modem delay or the receive modem delay is known, the unknown receive modem delay or transmit modem delay, as the case may be, may be determined by simple arithmetic. This principle forms the basis for the present invention that by setting the receive timing of multiple transceiver pairs of a TDM communication system in synchrony, the transceiver pairs are also synchronized if transmit timers are pushed ahead of receive timers, according to transceiver design, by some set time value. By achieving such synchrony in such a communications system, the advantages previously discussed are realized.

Continuing to refer to FIG. 5, in the prior technology systems, the transmit counter of each individual transceiver pair is pushed ahead in time of the receive counter by a set interval. Further, the modem delay for such transceiver pair is specific for the pair. In the prior systems, the user had to determine the modem delay (or each individual transceiver pair included a mechanism for making that determination) and program in the particular modem delay. That practice achieved a desired timing delay between receive signals and transmit signals for each transceiver pair, however, it did not synchronize timing for multiple transceiver pairs of a TDM communications system. Each pair nevertheless operated according to its own particular timing.

Still referring to FIG. 5, three example cases A,B,C of the principles of the preferred embodiment of the invention are illustrated. The cases are based on several assumptions. One assumption is that a known 500 Hz signal is available to all transceiver pairs in a TDM communications system as a benchmark for synchronizing transmit and receive signals of the multiple transceiver pairs. Another assumption is that there are 6½ bits between the signals, which bits may be varied, either increased or decreased, in order to synchronize the signals of the multiple transceiver pairs. One other assumption is that the modem delay for each transceiver pair and either the receive modem delay (in the case of the preferred embodiment) for each or the transmit modem delay for each are known.

Further referring to FIG. 5, each of the cases A,B,C may be described. In case A, both transmit modem delay ($T_{xmodd}$) and receive modem delay ($R_{xmodd}$) are zero. Therefore, the actual bits transmitted and the actual bits received are the same as the bits in the RF, that is 6½ bits based on the particular assumptions. This case is hypothetical, though, because in the real world the bits transmitted and the bits received are each different than the bits in the RF because there will be some modem delay. In case B, $T_{xmodd}$ is 2 and $R_{xmodd}$ is 0, giving a modem delay (modidly) of 2. In order to synchronize the transmit and receive signals of this case with the 500 Hz benchmark signal, the transmit signal must be pushed up by 2 bits, as illustrated. When pushed up, there are only 4½ bits between transmit and receive, rather than 6½ bits, so the transmit is coming 2 bits earlier than was the situation in case A. In case C, $T_{xmodd}$ is 0 and $R_{xmodd}$ is 3, giving a total modem delay (modidly) of 3. With respect to the receiver, then, the transmitter must be pushed ahead by 3 bit times. This case C illustrates the present invention operation scenario that by adjusting the timing of the receiver, the transmitter timing is adjusted. Therefore, for multiple transceiver pairs, if the receiver timing of each pair is adjusted (either delayed or pushed up) by the value of the particular modem delay for each respective pair given a benchmark signal for the communications system (for example, the 500 Hz signal assumed for purposes of illustration), the transmit timers of the respective transceiver pairs will be synchronized.

Figure 6:
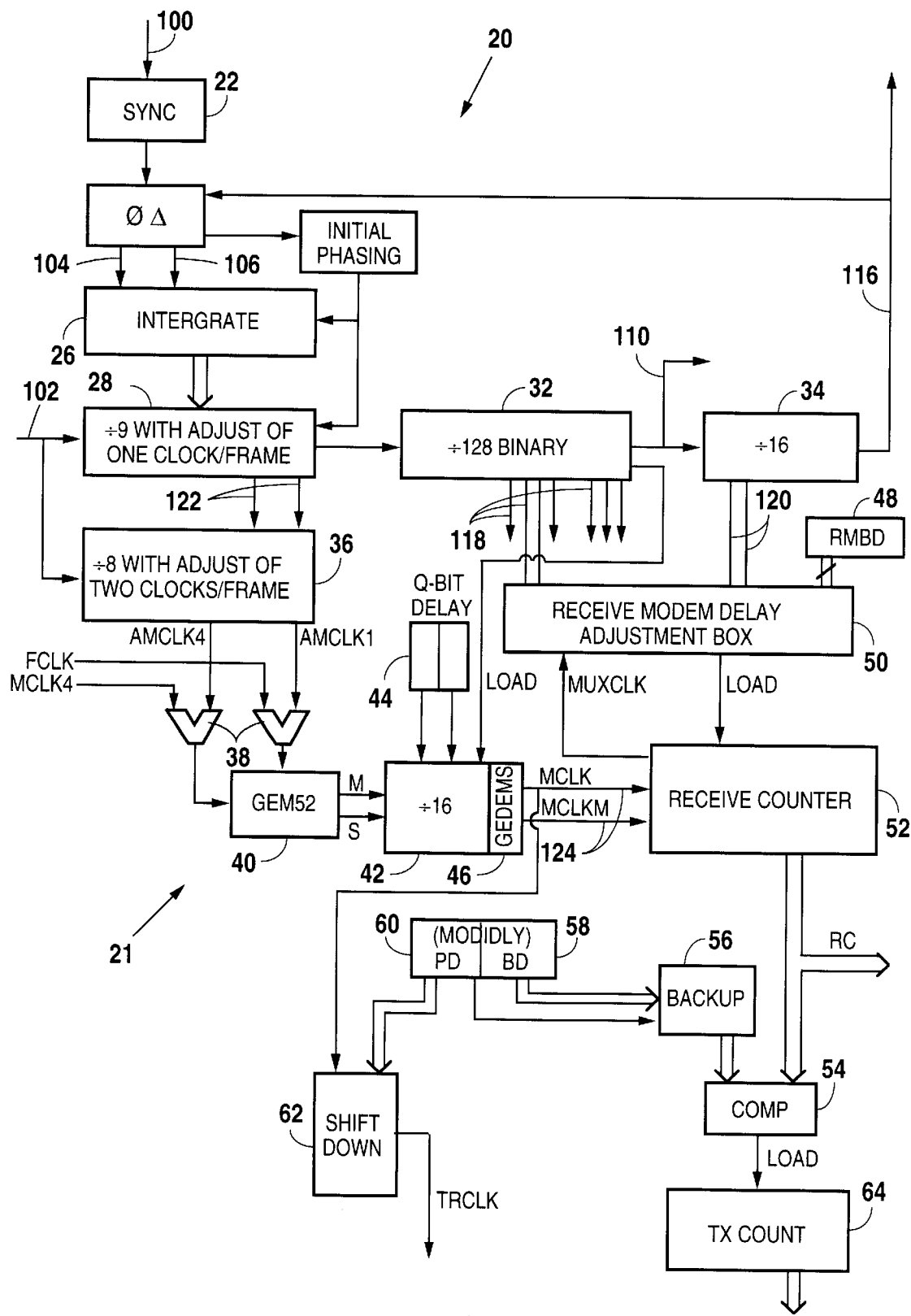
FIG. 6 is a block diagram illustration of the integrated circuit of a preferred embodiment of the present invention, which circuit serves to synchronize transmitters in accordance with the principles illustrated in FIG. 5.

Now referring to FIG. 6, an integrated circuit 20 that achieves timer adjustment according to the principles of the present invention (in order, for example, to synchronize transmit signals of cordless fixed parts of a TDM communications system) is illustrated. The particular embodiment shown and described is a preferred embodiment which is preferably employed in TDM transceiver pairs conforming to the CT2 standard. This same embodiment, as well as all possible alternative embodiments, which may have application in other TDM communication systems or otherwise are included in the invention.

Still referring to FIG. 6, the preferred embodiment of the integrated circuit 20 is suitable for application in a situation in which the transmitter timer of a transceiver pair is pushed ahead of the receiver timer by a particular value according to design of the pair. As previously discussed, this has been the practice in the prior technology. The preferred embodiment may be added to the circuitry of the transceiver pairs without varying that prior practice. This situation seems desirable since the operation of pushing up the transmit timer with respect to receive timer by modem delay is necessary, at least in the cordless portable part (CPP), and an objective in design of transceiver pairs for these systems has been to utilize the same transmit/receive circuitry in both CPP and cordless fixed part (CFP). This operation of pushing up the transmit timer is necessary in the CPP because the CPP is responsible for lining up the time division multiplexing in the air. So, the CPP is completely a slave to the CFP, i.e., the CFP transmits something and the CPP has to listen to it, figure out what time it was sent, and push the CPP's transmitter timer ahead so that they line up in the air. The preferred embodiment of the invention does not disturb the circuitry that pushed up the transmit timer.

Still referring to FIG. 6, in the preferred embodiment of the integrated circuit 20, an input of the receive modem delay value is necessary. The user must give the preferred embodiment of the integrated circuit 20 this value by programming it into a register, RMBD 48. The preferred embodiment of the integrated circuit 20 calculates the total modem delay. The preferred embodiment of the integrated circuit 20 adjusts the receiver timing (either delays or pushes up) based on the receive modem delay and total modem delay values in respect of a known synchronizing signal supplied to the circuit 20. Therefore, by so adjusting the receiver timing of each CFP of a TDM communications system, the preferred embodiment of the integrated circuit 20 causes the transmit timing of all the CFP's to be synchronized.

Continuing to refer to FIG. 6, the preferred embodiment of the integrated circuit 20 generally comprises a phase lock loop 22, 24, 26, 28, 30, 32, 34 in order to synchronize the internal clock timing of the transceiver containing the integrated circuit 20, which timing is based on the chip's crystal signal 102 synchronized with the benchmark signal 100, to the internal clock timing of all other transceivers of the communications system. This synchronization of crystal signal 102 and benchmark signal 100 is necessary because the crystal signal 102 and the benchmark signal 100 will have some tolerance, and those signals 102, 100 will be a bit different. The phase lock loop 22, 24, 26, 28, 30, 32, 34 serves to synchronize the signals 102, 100. In the preferred embodiment of the integrated circuit 20 for use in a CT2 chip for transceiver pairs in a TDM communications system, the benchmark signal 100 is 500 Hz and the crystal signal is 9.216 mHz.

Still referring to FIG. 6, the crystal signal 102 is divided down through a chain of dividers 28, 32, 34 to get, in the preferred embodiment, a 500 Hz compare signal 116. This compare signal 116 is compared with a synchronization port 22 accepting the benchmark signal 100 to determine which of the signals 100, 116 is ahead. An integrator 26 counts how far ahead the farther ahead of the signals 100, 116 is from the other signal. Then a first divider 28, preferably a nominally divide by nine divider, can adjust the crystal signal 102, as necessary, to bring it into conformity with the benchmark signal 100. The first divider 28 preferably adjusts the crystal signal 102 by one clock per frame (therefore, either an eight divide or a ten divide will from time to time occur) to take a little longer or a little shorter to run through the cycle. In this manner, the signals 100, 102 are eventually synchronized. A second divider 32, preferably a divide by one hundred twenty eight divider, and a third divider, preferably a divide by sixteen divider, yield the compare signal 116. Note that signals 110, 118, 120, for example, may be taken from this chain of dividers 28, 32, 24. Signals 118 are 32 kHz; Signal 110 is 8 kHz, and signals 120 are 500 Hz in the preferred embodiment. Synchronization does not take much time because the integrator 26 has determined how far off the signals 100, 116 are to each other, and the first divider 28, therefore, knows how many adjustments must be made. By achieving synchronization, the integrated circuit 20 has its own internal 500 Hz clock that is lined up with the benchmark signal 100. When such an integrated circuit 20 of each of multiple transceiver pairs in a TDM communications system performs this synchronization function to an identical benchmark signal 100 for all pairs, all transceiver pairs of the system will have identical, synchronized internal clocks.

Continuing to refer to FIG. 6, when internal clocks of the multiple transceiver pairs of a system are so identical and synchronized, each transceiver pair need only account for its respective operational idiosyncracies by adjusting transmit and/or receive timers according to those idiosyncracies. This is where the principles of receive timer adjustment by virtue of known values of total modem delay and either receive modem delay (as in the preferred embodiment) or transmit modem delay come into pay. As has been discussed, in the prior technology, the transmit timer has been set at a particular time ahead of the receive timer in transceiver pairs of these systems. The same principles of the present invention would apply, however, if a receive timing is fixed in relation to transmit timing. As has also been discussed, in the preferred embodiment of the invention a particular receive modem delay value must be determined specifically for each transceiver pair of these systems, and that value must be programmed into the preferred integrated circuit 20. This is accomplished in the preferred embodiment by means of the RMBD 48 of the integrated circuit 20. Alternatively, the same principles of the present invention apply if it is desired to synchronize receiver timing and transmit modem delay is known. For the various reasons previously discussed, in the preferred embodiment, receive timer adjustment in accordance with the principles of the invention results in synchronized transmit timing for all transceiver pairs of a system.

Further referring to FIG. 6, once the internal clock signal of the integrated circuit 20 is synchronized to the benchmark signal 100, adjustment to receive timing is made to effect desired transmit timing. The adjustment of receive timing is accomplished by remaining circuitry of the integrated circuit 20, shown in FIG. 6, that will hereinafter sometimes be referred to as the format section 21. This format section 21 must be kept locked-on to the internal clock signal, 500 Hz in the preferred embodiment, determined by the phase lock loop 22, 24, 26, 28, 32, 34 portion of the integrated circuit. Further, that internal clock signal of the format section 21 must be adjusted by the receive modem delay in order to effect synchronization of transmit timers for the communications system. To accomplish this adjustment of the internal clock signal of the format section 21, a format divider 36 block receives the crystal signal 102 and signals 122 from the first divider 28. In the preferred embodiment, the format divider 28 is a nominal divide by eight divider which tracks what the first divider 28 is doing and adjusts the crystal signal 102 by two clocks per frame (i.e., every time first divider 28 makes two adjustments, format divider 36 makes one adjustment). The signals from the format divider 36 then go through a regular clock generation inside the format clock 21, for example, via mux mechanisms 38 and divider blocks 40, 42, 46, to get a bit clock 124, for example, a 72 kHz bit clock in the preferred embodiment. That bit clock 124 is what clocks receive counter 52. In the preferred embodiment, every bit of the bit clock 124 clicks the receive counter 52 once. The receive counter 52 in the preferred embodiment controls a variety of matters with respect to reception. For example, in the preferred embodiment, the receive counter 52 tells the circuit 20 when to receive and what bit to receive. The receive counter 52 in the preferred embodiment also tells the circuit 20 the status (i.e., where its at) in the receive cycle.

Continuing to refer to FIG. 6, the several boxes 54, 56, 58, 60, 62, 64 below the divide blocks 40, 42, 46 and receive counter 52 represent a typical modem delay adjustment. In the preferred embodiment, the modem delay adjustment includes a shift down block 62, modem delay blocks 58, 60, a backup block 56, and a comparator 54 leading on to a transmit counter 64. As has been described, the modem delay adjustment portion of the circuit 20 has in the past, for example, pushed ahead the transmitter timing by some desired value in relation to the receive counter. The modem delay adjustment portion of the circuit 20 shown in FIG. 6 is a representation of how that adjustment may be performed.

Further referring to FIG. 6, a final portion of the circuit 20, a receive modem delay adjustment box 50, significant to performing the receive timer adjustment in accordance with the principles of the invention can be understood. The objective of the box 50 is to control the receive counter 52 based on the internal clock signal (500 Hz in the preferred embodiment) and a programmed receive modem delay value. Signals 118 and 120 are indicative of the status (i.e, where its at) of divider chain 32, 34 at certain places in time. The box 50 accomplishes its objectives by picking off certain states of the whole counter chain, decoding them, determining an appropriate state value that will start up the receiver timer correctly to give the desired effect of transmit timer synchronization, and loading the receive counter 52 at the right time with the value in order to start the receive counter 52 to achieve desired transmit timing.

Figure 7:
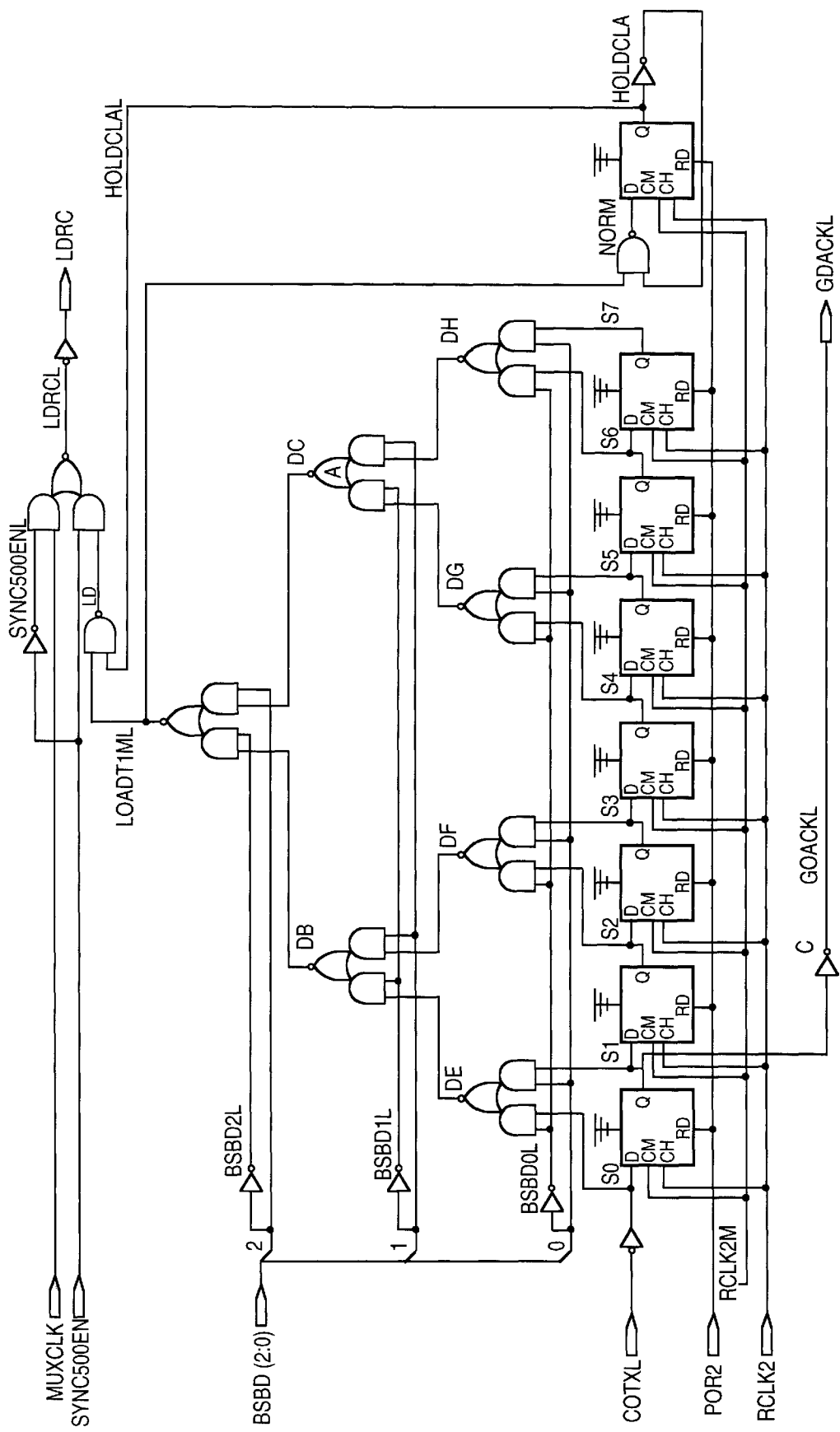
FIG. 7 is a detailed schematic of the preferred embodiment of the receive modem delay adjustment box of FIG. 6.
Figure 8:
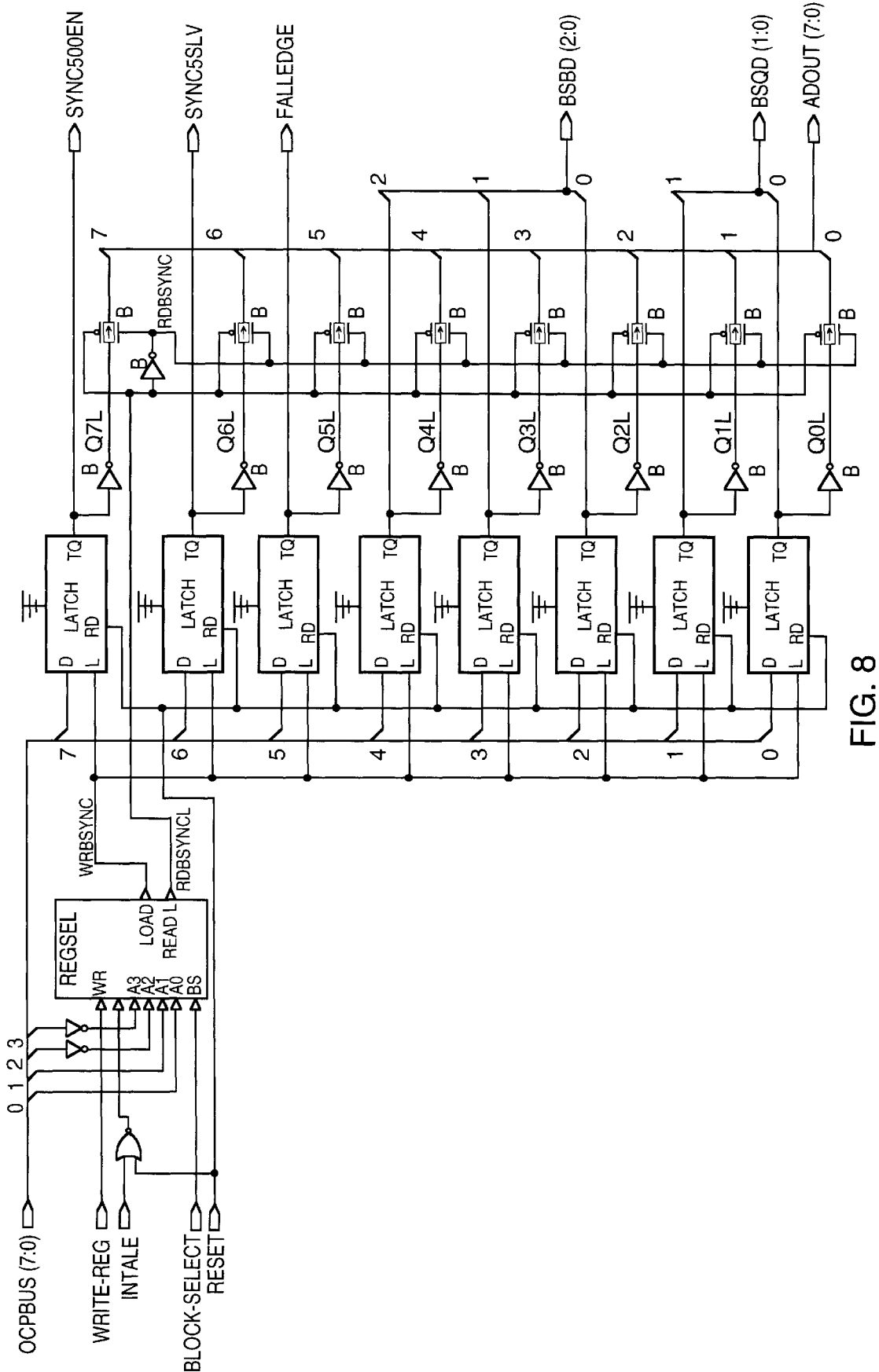
FIG. 8 is a detailed schematic of the preferred embodiment of the RMBD register (burst sync control register) of FIG. 6.

Now referring to FIGS. 7 and 8, details of the receive modem delay adjustment box 50 and RMBD 48, a register into which the receive modem delay is programmed, respectively, are given. These schematics show the preferred embodiment of the invention. Those skilled in the art will understand and appreciate what is illustrated by these schematics. Although these schematics show the preferred embodiment, alternative embodiments in accordance with the principles of the invention are possible, as those skilled in the art will appreciate.

One possible application of the present invention is, as has been stated, an integrated circuit for a cordless telephone handset and base unit, for example, such as the integrated circuit disclosed in co-pending, commonly assigned applications Ser. Nos. 07/917,488; 07/917,503; 07/918,627; 07/918,626; 07/918,625; 07/918,631; 07/918,632; 07/918,622; and 07/918,621; each filed on Jul. 21, 1992, and commonly assigned U.S. Pat. Nos. 5,404,459, issued Apr. 4, 1995, 5,408,639, issued Apr. 18, 1995, and 5,488,743, issued Sep. 5, 1995, which disclosure is hereby incorporated by reference and more specifically described in the table on pages 1–3A. If the present invention is so applied to the integrated circuit disclosed in those applications, the integrated circuit can be synchronized to an external 500 Hz signal (slave) or to an internally generated 500 Hz signal (master, default), to meet the requirements of CT2 Annex N for CFP's. In the application, software has visibility of the open-drain SYNC I/O signal, allowing software contention and hand-off mechanisms, and the present invention may be programmed as a master or slave to the SYNC signal. As a master, the invention phase-locks to the incoming 500 Hz signal. The phase-lock loop can track up to 216 ppm long term average frequency drift, (i.e. =/−432 nsec per 2 msec frame). Actual input drift must remain below the CT2-imposed 50 ppm (absolute) limit for system compliance. The invention supports larger peak jitter input, as long as the 216 ppm long term drift requirement is observed.

Further, according to CT2 Annex N, CFP transmission of bit B1 in Mux 1 starts at the antenna nominally 7 bit periods after the SYNC signal rises. In the present invention as applied to the integrated circuit disclosed in the incorporated patent applications, the receive timing is adjusted, indirectly adjusting the transmit data timing to meet the 7 bit delay requirement. Programmability is provided to allow for various RF delays. The programmable delay in conjunction with the programmed modem delay register allows any total RF modem delay (transmit modem delay+receive modem delay) up to 7.75 bit (107 $\mu$sec). When using the present invention in this application, the BSYNC register must be programmed before MECTR1[4] is set, and MECTR1[4] (Fifo clock enable) must be set for the format section 21 (shown in FIG. 6) to function correctly.

Control register definition for the present invention in this particular integrated circuit application is as follows:

| Name: | BSYNC (Burst Sync. Control) |
|---|---|
| Address: | FFD3 |
| Access: | R/W |
| Default: | 00H |
| Bit | Definition |
| 7 | Enable 500 Hz Synchronization |
| | 0: = Disabled (default, integrated circuit functionality) |
| | 1: = Synchronize format section 21 to 500 Hz |
| SYNC. | Applies to CFP only. |
| 6 | 500 Hz Slave/Master. Applies if bit 7 is set. |
| | 0: = Master (default). The format section 21 synchronizes to an internal free-running 500 Hz for SYNC. If enabled in P1SRC2[6], Port P1.6 is an output. |
| | 1: = Slave. The format section 21 synchronizes to an internal 500 Hz clock phase-locked to the SYNC input at P1.6. P1SRC2[6] must be set high. |
| 5 | 500 Hz SYNC Edge. 0: = Rising edge alignment. |
| | 1: = Failing edge alignment. |
| 4:0 | Burst Sync Delay: Five bits specify the receive demodulator RD delay $T_{RXRF}$ which is used with the RMBD register 48 (shown in FIG. 6) to determine the baseband data timing relative to the location of the 500 Hz SYNC signal. The programmable range is 0 to 7.75 bits (0 to 107 $\mu$sec) in ¼ bit intervals. |

| Bits [4:2] Bit delay | | Bits [1:0] Phase Delay | |
|---|---|---|---|
| 000 | 0 bits | 00 | 0/4 bit |
| 001 | 1 bit | 01 | ¾ bit |
| 010 | 2 bits | 10 | 2/4 bit |
| — | | 11 | ¼ bit |
| 110 | 6 bits | | |
| 111 | 7 bits | | |

| P1SRC2: | New Read/write bit |
|---|---|
| 6 | Enable P1.6 Pin to act as SYNC I/O |
| | 0: = Disabled (default, integrated circuit functionality) Port P1.6 is a microprocessor port. |
| | 1: = Port P1.6 is a SYNC signal I/O. The direction (input or output) is defined by bit 6 of the BSYNC register. When BSYNC[6] is low (master mode), P1.6 outputs a 50% duty cycle 500 Hz square wave which is active only if the FIFO and format section 21 are enabled in the MECTR1 register. |

As is clearly seen, the present invention is a significant improvement in the art. The present invention is believed to be especially effective when configured and employed as described herein, however, those skilled in the art will readily recognize that numerous variations and substitutions may be made in the invention and its use and configuration to achieve substantially the same results as achieved by the embodiments and, in particular, the preferred embodiment expressly described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A method of reducing noise between neighboring transceiver pairs wherein each pair includes a cordless fixed part and a cordless portable part and wherein each pair receives a benchmark signal, said method comprising the steps of:

defining and storing a receive modem delay value in each of said cordless fixed parts;

calculating a total modem delay value for each of said transceiver pairs; and synchronizing transmissions of said transceiver pairs by synchronizing a transmit timing of each of said transceiver pairs based on said benchmark signal, said receive modem delay value, and said total modem delay value.

2. A time division multiplexed communications system, comprising:

a plurality of transceiver pairs, each of said transceiver pairs including a cordless fixed part and a cordless portable part, each of said cordless fixed parts and said cordless portable parts being driven by an internal clock signal, wherein said cordless fixed parts transmit according to different transmit timers set in accordance with receive modem delay values of said transceiver pairs and include registers coupled to said transmit timers for storing said receive modem delay values;

a synchronizer coupled to said plurality of transceiver pairs for synchronizing said plurality of transceiver pairs by setting said transmit timers of said cordless fixed parts in accordance with said receive modem delay values; and a benchmark signal employed by each of said transceiver pairs;

wherein said synchronizer includes circuitry within each of said cordless fixed parts that serves to synchronize said internal clock signal to said benchmark signal.

3. Apparatus for synchronizing an over-the-air time division multiplexed communication system having a plurality of transceiver pairs, each of said pairs including a cordless fixed part and a cordless portable part, said apparatus comprising:

means for synchronizing an internal clock signal of each of said cordless fixed parts with a benchmark signal of the communication system;

means coupled to said synchronizing means for storing a receive modem delay value for each of said transceiver pairs;

means coupled to said storing means for calculating a total modem delay value for each of said transceiver pairs; and means within each of said transceiver pairs for setting a receiver timing of said transceiver pair based on said receive modem delay value and said total modem delay value of said transceiver pair with reference to said synchronized internal clock signal of said pair to synchronize the transmit timings of said cordless fixed parts of all of said plurality of transceiver pairs.

4. Apparatus for synchronizing an over-the-air time division multiplexed communication system, comprising:

a plurality of transceiver pairs each of which includes a cordless fixed part and a cordless portable part, wherein each of said transceiver pairs has a transmit timing, a receiver timing, a receive modem delay and a transmit modem delay;

means for calculating a total modem delay value for each of said transceiver pairs based on said receive modem delay and said transmit modem delay of said transceiver pair;

means, included in each of said transceiver pairs and coupled to said means for calculating, for storing a value of said receive modem delay;

means, included in each of said transceiver pairs and coupled to said storing means, for synchronizing an internal clock signal of said transceiver pair to a benchmark signal of said communication system; and means, included in each of said transceiver pairs and coupled to said means for storing, for setting said receiver timing based on the values of said receive modem delay and said total modem delay to synchronize said transmit timings of said transceiver pairs.

5. A circuit for synchronization of time division multiplexed transceiver pairs, comprising:

a phase locked loop arranged to synchronize an externally generated benchmark signal with an internally generated clock signal to provide a synchronized internal clock signal;

a first register arranged to a predetermined receive modem delay value;

a first counter circuit coupled to the phase locked loop and arranged to control receive timing;

a receive modem delay adjustment circuit coupled to the phase locked loop, the first the register, and the receive counter arranged to adjust the receive counter responsive to the receive modem delay value and synchronized internal clock signal; and a second counter circuit coupled to the receive counter and arranged to control transmit timing responsive to the receive counter.

6. The circuit of claim 5, wherein the benchmark signal is about 500 Hz.

7. The circuit of claim 5, wherein the internal clock signal is about 9.216 MHz.

8. The circuit of claim 5, wherein the phase locked loop includes:

a plurality of divider circuits arranged to receive the clock signal and generate a compare signal, a compare circuit arranged to receive the compare signal and the benchmark signal and generate a lead signal to indicate which signal leads the other;

an integrator circuit coupled to the compare circuit and to the divider circuits and arranged to determine a magnitude by which either of the compare signal and benchmark leads the other; and wherein the plurality of dividers includes a first divider circuit coupled to the integrator circuit and arranged to adjust the clock signal to be synchronized with the benchmark signal.

9. A method for reducing noise between neighboring transceiver pairs, each pair including a first transceiver and a second transceiver, comprising the steps of:

receiving a benchmark signal at each of the first transceivers;

synchronizing internal clock signals at the first transceivers with the benchmark signal to provide synchronized internal clock signals at the first transceivers;

adjusting receive timing at the first transceivers using the synchronized internal clock signals and respective predetermined receive modem delays; and generating transmit timing at the first transceivers relative to adjusted receive timing of the first transceivers.

10. The method of claim 9, wherein the first transceivers are cordless fixed transceivers and the second transceivers are cordless portable transceivers.

11. The method of claim 9, wherein the benchmark signal includes is about 500 Hz.

12. The method of claim 9, wherein the internal clock signal includes is about 9.216 MHz.

13. The method of claim 9, wherein the step of generating transmit timing uses respective predetermined modem delays of the first transceivers.

14. A method for reducing noise between neighboring transceiver pairs, each pair including a first transceiver and a second transceiver, the first transceiver performing the steps of:

receiving a benchmark signal;

synchronizing an internal clock signal with the benchmark signal to provide a synchronized internal clock signal;

adjusting transmit timing at the first transceiver using the synchronized internal clock signal and a predetermined transmit modem delay; and generating receive timing at the first transceiver relative to adjusted transmit timing.

* * * * *

UNITED STATES PATENT AND TRADEMARK OFFICE
CERTIFICATE OF CORRECTION

PATENT NO.   : 5,898,685
DATED        : April 27, 1999
INVENTOR(S)  : Schnizlein It is certified that error appears in the above-identified patent and that said Letters Patent is hereby corrected as shown below:

Column 8,
Line 15, "idiosyncracies" should read -- idiosyncrasies --.
Line 16, "idiosyncracies" should read -- idiosyncrasies --.
Line 20, "pay" should read -- play --.

Column 9,
Line 27, "i.e," should read -- i.e. --.

Column 13
Line 18, please delete "includes".
Line 20, please delete "includes".

Signed and Sealed this

Nineteenth Day of March, 2002

Attest:

JAMES E. ROGAN
Director of the United States Patent and Trademark Office

Attesting Officer